March 11, 1947. B. F. WHEELER 2,417,282
VISCOUS DAMPING SYSTEM
Filed Jan. 30, 1945

INVENTOR.
BENJAMIN F. WHEELER
BY
ATTORNEY

Patented Mar. 11, 1947

2,417,282

UNITED STATES PATENT OFFICE 2,417,282

VISCOUS DAMPING SYSTEM

Benjamin F. Wheeler, Haddonfield, N. J., assignor to Radio Corporation of America, a corporation of Delaware Application January 30, 1945, Serial No. 575,335

1 Claim. (Cl. 188—90)

This invention relates to an improved viscous damping system for preventing or minimizing "hunting" in rotatable devices such, for example as the shaft of a servo-motor or similar control.

The ideal anti-hunting device for a rotatable shaft would be one capable of introducing a force, opposing the shaft rotation, which is proportional to the angular velocity of the shaft and one which at the same time introduces substantially no friction.

Accordingly, the principal object to the present invention is to provide a viscous anti-hunting device which approximates this ideal, and one which obviates the objectionable aspects of oil filled "vane-type" devices.

Another and important object of the present invention is to provide an improved damping system of the viscous type and one incorporating means for compensating for variations in the viscosity of the damping material with changes in the temperature to which said material is subjected during normal or indeed abnormal operating conditions.

Figure 1:
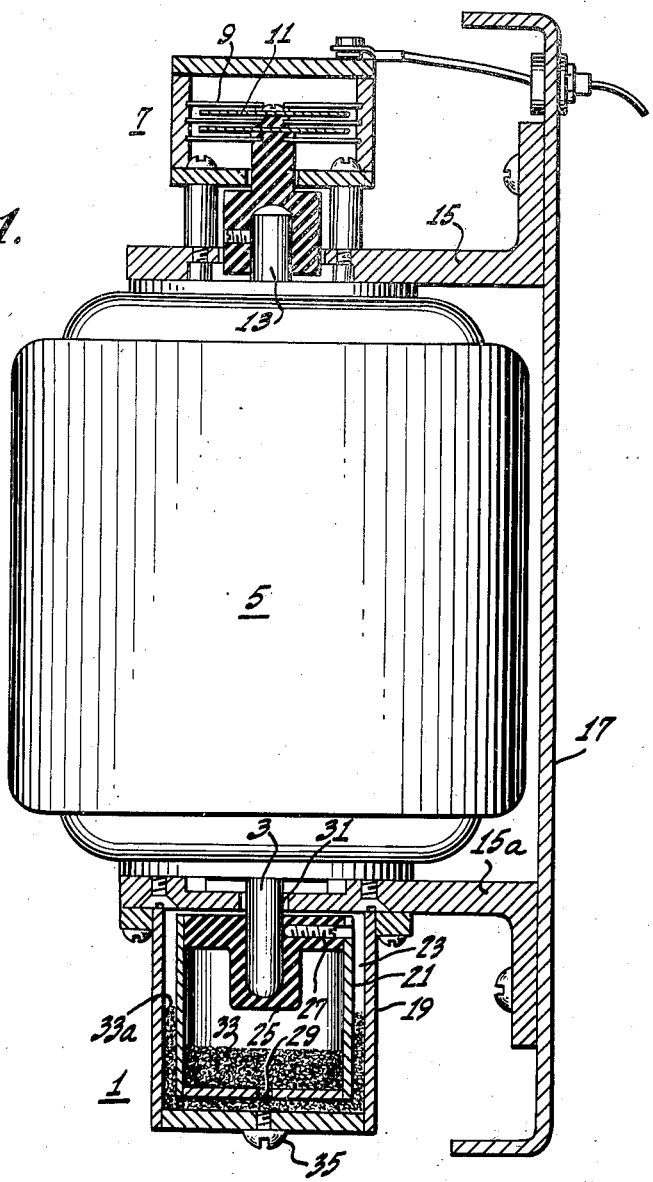
Figure 2:
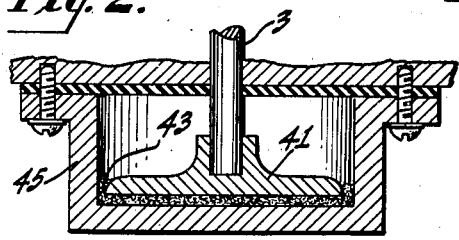

Other objects and advantages will be apparent and the invention itself will be best understood upon a reference to the following specification and to the accompanying drawing, wherein:

Figure 1 is an elevational view, partly in section, showing an installation including a servo-motor having a temperature compensated viscous damping system applied to the shaft thereof, and Figure 2 is a sectional view of a simplified viscous damping device within the invention.

In Figure 1 of the drawing a viscous damping device, indicated generally at 1, is shown as applied to the shaft 3 of a servo-motor 5. In the instant case the shaft 3 is employed for varying the capacitance of a variable "trimmer condenser" 7. The condenser 7 is of conventional design and comprises a number of interleaved semi-circular (or semi-elliptical) stator and rotor plates 9 and 11, respectively; the rotor plates 11 being coupled to the driving shaft 3 by stub shaft 13 and the entire assembly including the motor 5 being supported preferably in a vertical direction by a pair of brackets, 15, 15a, on an upright panel 17. The necessity for a highly effective damping device in an assembly of this character will be apparent when it is appreciated that rotation of the shaft 3 through an angle of but 90° will vary the capacitance of the condenser 7 throughout its entire operating range.

In the embodiment of the invention shown at 1 in Fig. 1 the damping mechanism for the shaft 3 consists essentially of a stator cup 19 and a rotor cup 21, which is presented across an intervening space 23 to the interior of the stator. The outer cup, or cylinder 19 may be secured either to the housing of the motor 5 or to the lower bracket 15 and the rotor or inner cylinder 21 is fixed on the end of shaft 3 as by means of a bushing 25 and screw 27.

It will be observed that the inner cylinder 21 is closed at the top by the bushing 25 and that there is a small aperture 29 in the opposite or bottom surface of the said cylinder. The top of the outer cylinder 19, on the other hand, is not completely closed but has a small clearance or passageway 31 adjacent to the shaft 3 through which air may enter the space 23 between the rotor and the stator. The space 23, and the interior of the rotor or inner cup 21 are provided, in accordance with the invention, with a partial filling 33 of oil or other viscous liquid which may be entered into the said spaces through a filling plug 35 in the outer or stator cup 19. The liquid filling 33 preferably comprises a highly viscous material such, for example as, "Vistac No. 1" (made by Advance Solvents & Chemical Corp. N. Y.) which has a viscosity of 126,000 (universal) at 100° Fahrenheit, and which is understood to comprise a hydrocarbon compound treated to form a stable and tacky polymer. This material, while otherwise excellent for damping purposes, has a bad temperature coefficient of viscosity. Thus, in the absence of any means for compensating for the "thinning" and "thickening" of the fluid, with temperature, the damping effect will be different at different temperatures. That the parts 19 and 21 provide such compensating means will be apparent when it is appreciated that as the relative fluidity of the damping material increases with an increase in temperature the air within the cylinder or reservoir 21 will expand and some of the fluid therein is forced through the aperture 29 to augment the supply 33a in the space 23. The lowered viscosity of the fluid is thus compensated for by an increase in the effective coupling area between the opposing faces of the rotatable and fixed surfaces. Conversely, as the air in the cylinder 21 contracts upon cooling some of the liquid in the space 23 is drawn through the aperture 29 into the said inner cylinder to decrease the effective coupling between the said surfaces.

As shown in Fig. 2, when the temperature-compensating feature is not required the present invention contemplates the use of a flat disc 41 for the hollow cylinder 21 of Fig. 1. In this case, as before the device is arranged with the shaft 3 in the vertical direction so that there is always a supply of the damping fluid 43 between the opposed faces of the rotary member 41 and the inner bottom-surface of the stationary cup 45. The advantage of the disc 41 when used with a tacky fluid, as compared with a conventional vane-type mechanism using an oil may be attributed to the fact that the required damping action is achieved in the instant case with a device characterized by the simplicity and economy of its parts.

It will now be apparent that the present invention provides an improved damping system and one which obviates the objectionable features of oil-filled "vane-type" mechanisms.

What is claimed is:

In apparatus of the character described, a shaft mounted for rotation about a vertical axis, a fluid receptacle mounted on the lower end of said rotatable shaft for rotation therewith and having an aperture in the bottom thereof, a second fluid receptacle within which said first receptacle is adapted to rotate, and a partial filling of a viscous liquid in said receptacles for damping the movement of said shaft about its said vertical axis, said rotatable receptacle having a closed top and containing a filling of gas above said partial filling of liquid.

BENJAMIN F. WHEELER.

REFERENCES CITED

The following references are of record in the file of this patent:

UNITED STATES PATENTS

| Number | Name | Date |
|---|---|---|
| 1,453,119 | Barr et al. | Apr. 24, 1923 |
| 2,182,076 | Elmer | Dec. 5, 1939 |